(12) United States Patent
Kang et al.

(10) Patent No.: US 6,923,158 B2
(45) Date of Patent: *Aug. 2, 2005

(54) ENGINE TORQUE CONTROL APPARATUS

(75) Inventors: Jihoon Kang, Fuji (JP); Yasutaka Kawamura, Fuji (JP)

(73) Assignee: Jatco Ltd, Fuji (JP)

(*) Notice: Subject to any disclaimer, the term of this patent is extended or adjusted under 35 U.S.C. 154(b) by 31 days.

This patent is subject to a terminal disclaimer.

(21) Appl. No.: 10/650,085

(22) Filed: Aug. 28, 2003

(65) Prior Publication Data

US 2004/0129251 A1 Jul. 8, 2004

(30) Foreign Application Priority Data

Aug. 30, 2002 (JP) ........................................ 2002-254057

(51) Int. Cl.⁷ .............................................. F02D 7/00
(52) U.S. Cl. .......................... 123/396; 123/396; 123/349
(58) Field of Search ................................. 123/396, 395, 123/319, 349, 350

(56) References Cited

U.S. PATENT DOCUMENTS 4,644,334 A * 2/1987 Yato et al. .................... 340/679
5,339,776 A * 8/1994 Regueiro .............. 123/196 CP

OTHER PUBLICATIONS

U.S. Appl. No. 10/650,076, filed Aug. 28, 2003, Kang et al.

* cited by examiner

Primary Examiner—Bibhu Mohanty
(74) Attorney, Agent, or Firm—Foley & Lardner LLP

(57) ABSTRACT

An engine torque control apparatus for controlling the output torque of an engine (60) connected to a transmission (40) in a vehicle has a temperature sensor (55) for detecting the temperature of oil used by the transmission (40), and a controller (50) for limiting the output torque of the engine to an engine torque limit or less. The controller (50) functions to compare the oil temperature with a specific temperature, to set the engine torque limit to a first limiting value when the oil temperature is equal to or less than the specific temperature, and to increase the engine torque limit at a predetermined increase rate when the oil temperature exceeds the specific temperature.

10 Claims, 7 Drawing Sheets

ENGINE TORQUE CONTROL APPARATUS

FIELD OF THE INVENTION

This invention relates to a control apparatus for controlling the output torque of an engine to a transmission system for transmitting the driving force of the engine to a driving wheel.

BACKGROUND OF THE INVENTION

A belt CVT (Continuously Variable Transmission) is known as a change gear installed in automobiles. A belt CVT comprises a primary pulley for inputting the driving force of the engine, a secondary pulley for outputting the driving force to the driving wheel, and a V-belt wound around the primary pulley and secondary pulley for transmitting the driving force inputted from the primary pulley to the secondary pulley. The pulley width of the primary pulley and the secondary pulley can be varied by the oil pressure supplied to the primary pulley and secondary pulley. When changing gears, oil pressure supplied to the primary pulley and secondary pulley adjusts the pulley width and thus to vary the ratio (pulley ratio) of the contact radius (effective radius) in relation to the primary pulley and secondary pulley of the V-belt. Thus, the ratio of rotation speed (gear ratio) between input and output is adjusted.

It is important that belt slippage does not occur in the belt CVT in order to prevent reduction in belt durability. Belt slippage can be prevented by increasing the oil pressure supplied to the primary pulley and secondary pulley to thereby increase the force at which the primary pulley and secondary pulley hold the V-belt.

In cold climates, it is not uncommon for the temperature of the oil supplied to the primary pulley and secondary pulley to fall below −20° C. while the automobile is parked. Under such conditions, since the pressure of the oil supplied to the primary pulley and secondary pulley does not rise due to the increased oil viscosity, it is possible that the force for holding the V-belt between the two pulleys will be insufficient and that belt slippage will occur. In such cases, the prior art prevents the torque from increasing by limiting the engine output torque, which results in prevention of belt slippage.

SUMMARY OF THE INVENTION

In the prior art, however, when oil temperature rises and oil viscosity decreases to remove the engine output limit, it is possible that large shocks will occur causing belt slippage because of large variations in engine output.

An object of this invention is to provide an engine output control apparatus whereby it is possible for the vehicle to run smoothly and for belt slippage in the belt CVT to be prevented without the occurrence of large shocks even at low temperatures.

In order to achieve the above object, this invention provides an engine torque control apparatus for controlling an output torque of an engine connected to a transmission in a vehicle. The engine torque control apparatus comprises a temperature sensor for detecting a temperature of oil supplied to the transmission and a controller for limiting the output torque of the engine to an engine torque limit or less, the controller being linked to the temperature sensor. The controller functions to compare the oil temperature with a specific temperature; set the engine torque limit to a first value when the oil temperature is equal to or less than the specific temperature; and increase the engine torque limit at a predetermined increase rate when the oil temperature is greater than the specific temperature.

Further, this invention provides a control method for controlling an output torque of an engine connected to a transmission in a vehicle. The control method comprises the steps of detecting a temperature of oil supplied to the transmission; comparing the oil temperature with a specific temperature; setting an engine torque limit to a first value when the oil temperature is equal to or less than the specific temperature; increasing the engine torque limit at a predetermined increase rate when the oil temperature is greater than the specific temperature; and limiting the output torque of the engine to the engine torque limit or less.

The details as well as other features and advantages of this invention are set forth in the remainder of the specification and are shown in the accompanying drawings.

DESCRIPTION OF THE PREFERRED EMBODIMENTS

The first embodiment will be described with reference to FIG. 1 through FIG. 4.

Figure 1:
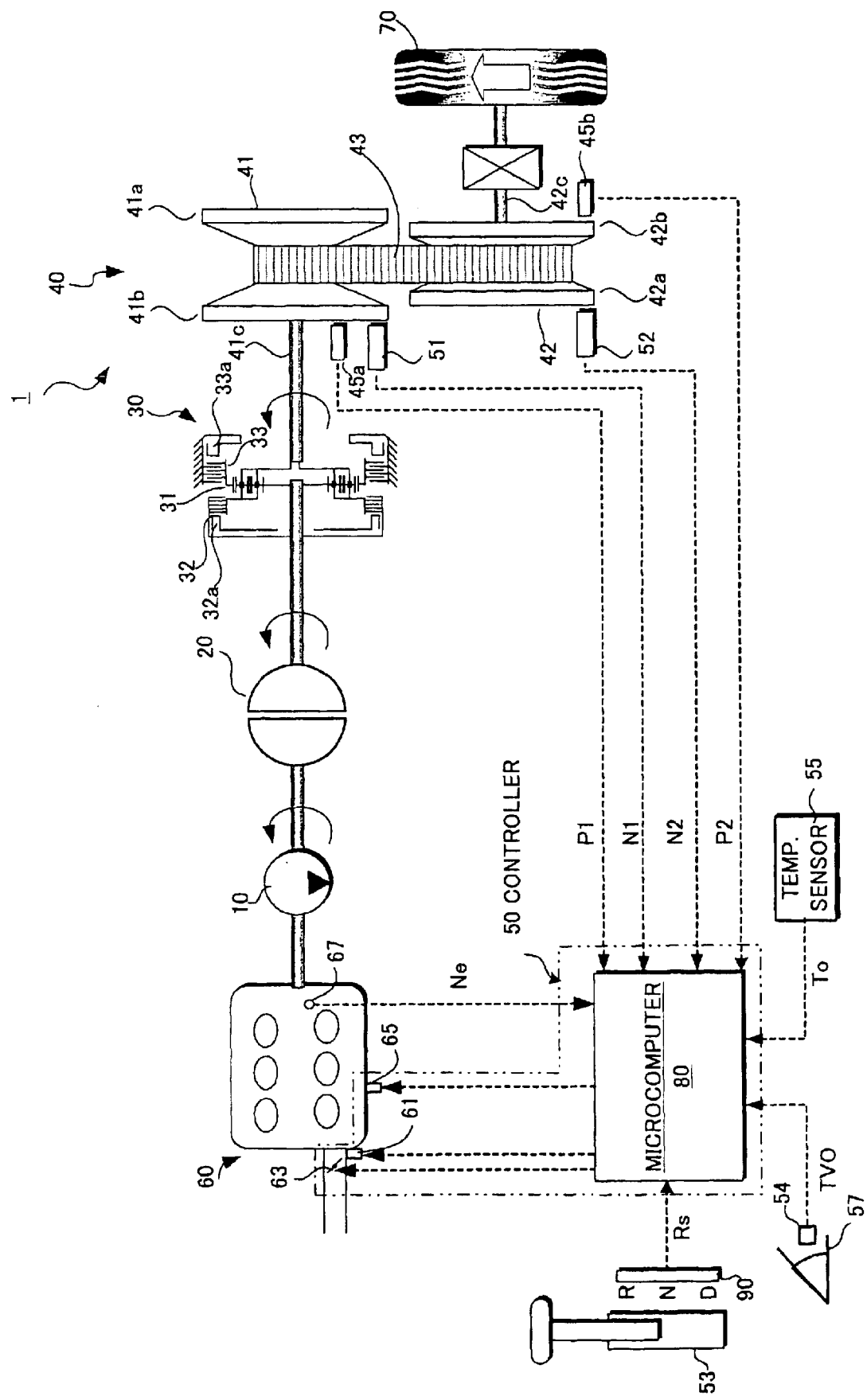
FIG. 1 is a schematic structural diagram showing a control apparatus for controlling the engine torque to a transmission system for a vehicle according to the first embodiment.

FIG. 1 shows a control apparatus for controlling the engine torque inputted to a transmission system for a vehicle. The transmission system 1 comprises a pump 10, a torque converter 20, a forward-reverse switching apparatus 30, and a transmission 40. The transmission system 1 converts the torque outputted from an engine 60 and transmits it to a driving wheel 70.

The controller 50 for controlling the engine 60 comprises a microcomputer 80, a fuel injector 61 for injecting fuel into the engine 60, a throttle valve 63 for controlling the air intake of the engine 60, and an ignition apparatus 65 for igniting the fuel. The fuel injector 61, the throttle valve 63, and the ignition apparatus 65 are capable of operating according to command signals from the microcomputer 80.

The microcomputer 80 has a central processing unit (CPU) for running programs, read-only memory (ROM) for storing programs and data, random access memory (RAM) for temporarily storing data acquired as computing results from the CPU, and an input/output interface (I/O interface). The controller 50 may comprise a plurality of microcomputers.

The controller 50 controls the engine torque Te and the engine rotation speed Ne by adjusting the quantity of fuel injected by the fuel injector 61, the opening of the throttle valve, or the ignition timing of the ignition apparatus 65, or a plurality of thereof. The engine rotation speed Ne is detected by an engine revolution sensor 67. An accelerator pedal sensor 54 detects the travel (depression amount) of an accelerator pedal 57. Usually the throttle valve opening TVO corresponds to the accelerator pedal travel. Therefore, an accelerator pedal sensor 54 indirectly detects the throttle valve opening TVO. Of course, a sensor that directly detects the throttle valve opening may also be provided.

A shift lever 53 is used so that the user can change the operating range of the transmission system. The operating range of the transmission system includes at least a drive range (D range) for moving the vehicle forward, a reverse range (R range) for moving the vehicle backward, and a neutral range (N range) or a parking range (P range) for stopping the vehicle.

The pump 10 is driven by the revolutions of the engine 60 and is designed to pump oil. The pressure of the pumped oil is adjusted, after which the oil is sent to the forward-reverse switching apparatus 30 and the transmission 40, and is utilized in forward-reverse switching and gear shifting. The oil pressure is adjusted by a pressure regulating valve (not shown).

The torque converter 20 is provided between the engine 60 and the forward-reverse switching apparatus 30, and the drive force of the engine 60 is transmitted by the current of the oil inside the torque converter 20.

The forward-reverse switching apparatus 30 has a planetary gear set 31 for changing the power transmission path between the engine and the transmission, a forward clutch board 32, and a reverse clutch board 33. The forward clutch board 32 is joined to a forward clutch piston, and is connected to the planetary gear set 31 by the force of the oil pressure (forward clutch pressure) supplied to a forward clutch piston chamber 32a in the D range. The reverse clutch board 33 is joined to a reverse clutch piston, and is connected to the planetary gear set 31 by the force of the oil pressure (reverse clutch pressure) supplied to a reverse clutch piston chamber 33a in the R range. In the N range and P range, oil is not supplied and the forward clutch board 32 and reverse clutch board 33 are released together. When the forward clutch board 32 is connected to the planetary gear set 31, forward revolutions are outputted to an input shaft 41c of a primary pulley 41. When the reverse clutch board 33 is connected to the planetary gear set 31, reverse revolutions are outputted to the input shaft 41c of the primary pulley 41.

A direction control valve (not shown) for controlling the supply direction of the oil selects the engagement of the forward clutch board 32 or the reverse clutch board 33. The direction control valve switches the supply direction of the oil between the direction toward the forward clutch piston chamber 32a and the direction toward the reverse clutch piston chamber 33a. When the vehicle is moving forward (namely, when in the D range), in addition to supplying forward clutch pressure and connecting the forward clutch board 32, the reverse clutch board 33 is released by releasing the reverse clutch pressure into a drain. When the vehicle is in reverse (namely, when in the R range), in addition to releasing the forward clutch board 32 by releasing the forward clutch pressure into a drain, the reverse clutch pressure is supplied and the reverse clutch board 33 is connected. When the vehicle is stopped (namely, in the N range or P range), the forward clutch board 32 and the reverse clutch board 33 are released together by releasing the forward clutch pressure and the reverse clutch pressure into a drain. In this case, the direction control valve is in the middle position, and oil is not supplied to the forward clutch piston chamber 32a or the reverse clutch piston chamber 33a.

In the present embodiment, the transmission 40 is a belt CVT but is not limited thereto. Such a transmission 40 comprises a primary pulley 41, a secondary pulley 42, and a V-belt 43.

The primary pulley 41 is an input pulley in which the driving force of the engine 60 is inputted. The primary pulley 41 comprises a fixed conical plate 41a that rotates in unison with the input shaft 41c and a movable conical plate 41b capable of being displaced. A V-shaped pulley groove is formed between the fixed conical plate 41a and the movable conical plate 41b, and the V-shaped V-belt 43 is disposed in the pulley groove. The movable conical plate 41b is displaced in the input shaft direction by the oil pressure acting on the primary pulley 41 (hereinafter referred to as "primary pressure"). The revolution speed N1 of the primary pulley 41 is detected by a revolution speed sensor 51 for the primary pulley.

The secondary pulley 42 transmits the driving force transmitted by the V-belt 43 to the driving wheel 70 via an idler gear or a differential gear. The secondary pulley 42 comprises a fixed conical plate 42a that rotates in unison with an output shaft 42c, and a movable conical plate 42b capable of being displaced. A V-shaped pulley groove is formed between the fixed conical plate 42a and the movable conical plate 42b, and the V-belt 43 is disposed in the pulley groove. The movable conical plate 42b is displaced in the output shaft direction in response to the oil pressure acting on the secondary pulley (hereinafter referred to as "secondary pressure"). The pressurized area of the secondary pulley and the pressurized area of the primary pulley are equal or nearly equal. The revolution speed of the secondary pulley 42 is detected by a revolution speed sensor 52 for the secondary pulley. The speed of the vehicle is calculated from the revolution speed N2 of the secondary pulley 42.

The V-belt 43 is wound around the primary pulley 41 and secondary pulley 42, and transmits the driving force inputted by the primary pulley 41 to the secondary pulley 42.

The controller 50 calculates the speed ratio (N1/N2) of the transmission 40 based on signals from the revolution speed sensor 51 for the primary pulley and the revolution speed sensor 52 for the secondary pulley. The maximum transmittable torque of the transmission 40 is calculated based on the speed ratio and a secondary oil pressure signal P2 from an oil pressure sensor 45b, referring to a map (not shown) which associates the maximum transmittable torque with the speed ratio and the secondary oil pressure. The transmission 40 can transmit the torque less than the maximum transmittable torque without a slip of the V-belt 43.

The controller 50 also controls the direction control valve (not shown) and controls the supply of oil to the forward clutch piston chamber 32a and the reverse clutch piston chamber 33a; in other words, adjusts the forward clutch pressure and the reverse clutch pressure, thereby controlling the connected state of the clutch. Furthermore, when the forward clutch board 32 and the reverse clutch board 33 change from a released state to a connected state in relation to the planetary gear set 31, the controller 50 rapidly fills oil into the forward clutch piston chamber 32a or the reverse clutch piston chamber 33a via the direction control valve, quickly increasing the forward or reverse clutch pressure up to the connection pressure which is required to connect the clutch.

Furthermore, the controller 50 reads the revolution speed N1 of the primary pulley and the revolution speed N2 of the secondary pulley and computes the speed ratio (N1/N2), which is the ratio of the rotation speed N1 of the primary pulley to the rotation speed N2 of the secondary pulley. The controller 50 reads the range signal Rs from a shift lever position sensor 90 for detecting the position of the shift lever 53, the signal of a vehicle speed (namely, the rotation speed of the secondary pulley), the signal from the accelerator pedal sensor 54, the signal from an oil temperature sensor 55, and the oil pressure signals from the oil pressure sensors 45a, 45b, and determines the desired speed ratio based on these signals and the actual speed ratio. Furthermore, the controller 50 calculates the desired pressure of the primary pressure and secondary pressure for achieving the desired speed ratio, and controls a pressure regulating valve (not shown) to adjust the oil pressure supplied to the primary pulley 41 and the secondary pulley 42 to achieve the desired pressure.

Figure 2:
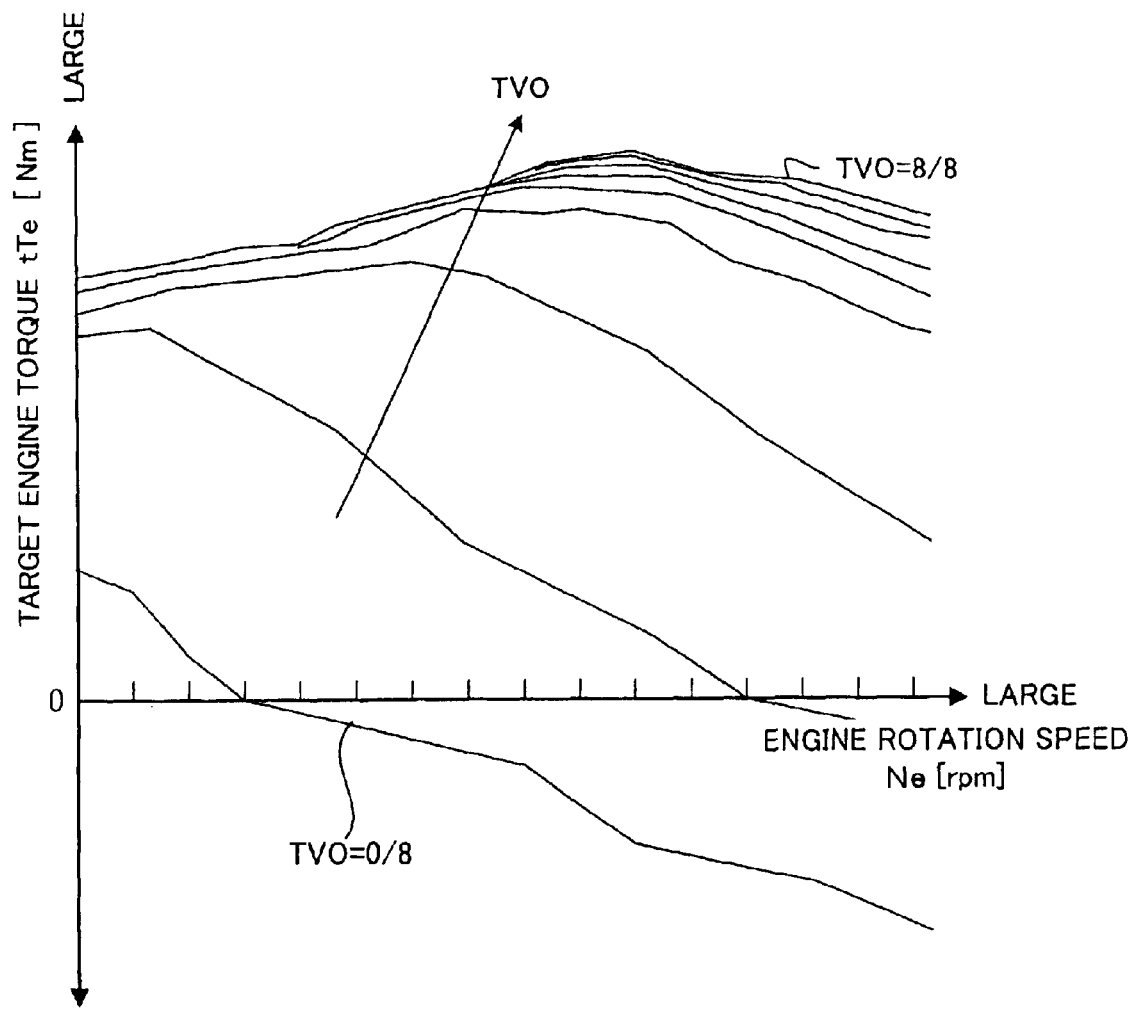
FIG. 2 is a map showing the relationship between the engine rotation speed and target engine torque at each quantity of accelerator pedal travel (throttle valve opening).

FIG. 2 is a map showing the relationship between the engine rotation speed and engine torque at each quantity of throttle valve opening TVO. The controller 50 stores the map in FIG. 2 in the ROM of the microcomputer 80. Referring to the map, the microcomputer 80 can calculate the target engine torque tTe based on the accelerator pedal travel TVO and the engine rotation speed Ne.

When the temperature of the oil supplied to the forward-reverse switching apparatus 30 and the transmission 40 is less than a specific temperature, the controller 50 limits the engine torque (which corresponds to the input torque of the transmission system 1) at a first limiting value, and when the oil temperature is greater than a specific temperature, the engine torque limit Tl is gradually raised. Gradually raising the engine torque limit Tl prevents belt slippage at low temperatures and also prevents shocks resulting from raising the engine torque limit Tl.

The control routine for controlling the engine torque performed by the controller 50 will be described with reference to the flow chart shown in FIG. 3. The control routine is performed repetitively.

In step S11, it is determined whether the oil temperature To received from the oil temperature sensor 55 is equal to or less than a predetermined oil temperature of −20° C. If the determination is affirmative, the routine proceeds to step S12. The reason that the specific temperature is −20° C. or less is because preferable oil pressure cannot be obtained at a temperature of −20° C. or less as a result of high oil viscosity. The specific temperature depends on the type of oil.

In step S12, the maximum transmittable torque of the transmission 40 is calculated from the actual oil pressure and the speed ratio, and the engine torque limit Tl is set at the first limiting value which is equal to the maximum transmittable torque in this embodiment. The maximum transmittable torque is the maximum torque that the transmission 40 can transmit at a temperature of −20° C. or less.

In step S13, the engine torque is kept below the engine torque limit Tl in a state of maintaining the engine torque limit Tl. For example, this is done by controlling the amount of fuel supplied to the engine.

In step S14, it is determined whether the oil temperature To is greater than −20° C. When the determination is negative, the routine returns to step S13 and the engine torque limit Tl continues to be maintained. When the oil temperature To is greater than −20° C., the routine proceeds to step S15.

In step S15, the engine torque limit Tl increases by an increment of ΔTr (for example 2 Nm). Then in step S16, the wait time tw is set at a predetermined short time of the order of milliseconds, and the routine is stopped during the wait time tw. In this embodiment, the predetermined short time is 10 msec. Thus, the engine torque gradually can increase because the engine output limit is gradually raised.

In step S17, it is determined whether the engine torque limit Tl is greater than or equal to the target engine torque tTe. If the determination is negative, the routine returns to step S15 and the engine torque limit Tl continues to gradually increase. The engine torque limit Tl increases at a predetermined increase rate (for example 200 Nm/sec) by repeating steps S15 and S16.

When the engine torque limit Tl exceeds the target engine torque tTe, the routine proceeds to step S18. At this point, referring to FIG. 2, the target engine torque tTe is the original engine torque to be outputted by the engine, which is calculated based on the engine rotation speed Ne and the accelerator pedal travel (i.e. the throttle valve opening TVO).

In step S18, the engine torque limit Tl is set at a second limiting value so that the original engine torque to be outputted by the engine is not limited. The second limiting value is greater than the maximum output torque of the engine 60, and is preferably near the maximum output torque of the engine 60. Thus, the engine 60 can output the target engine torque tTe calculated with reference to FIG. 2 from the engine rotation speed Ne and the accelerator pedal travel TVO.

Figure 4A:
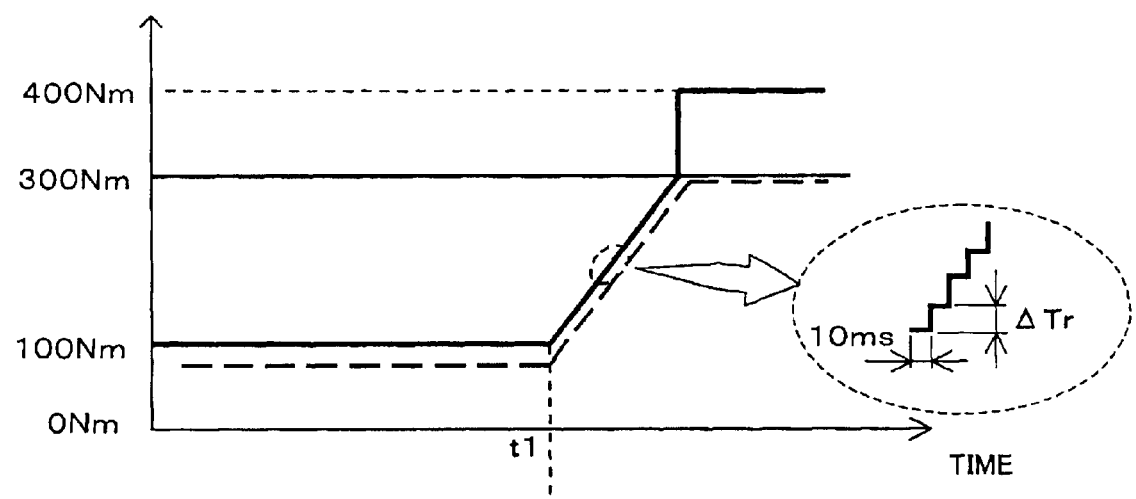
FIG. 4A is a graph showing the temporal change in engine torque limit and the temporal change in engine torque according to the first embodiment.
Figure 4B:
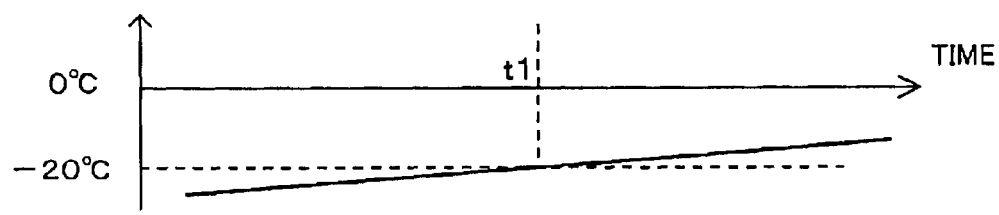
FIG. 4B is a graph showing the temporal change in oil temperature.

The results of the first embodiment will be described with reference to FIG. 4. FIG. 4A shows the change over time in engine torque limit Tl at engine start-up and in real input torque from the engine to the transmission system. The thick solid line shows the engine torque limit Tl, and the dashed line shows the input torque from the engine. The part of the graph showing the increasing engine torque limit Tl is enlarged. FIG. 4B shows the change over time in oil temperature.

The oil temperature is −20° C. or less until time t1 (see FIG. 4B). Below −20° C., the engine torque limit Tl is set at the first limiting value to control the input torque from the engine. The first limiting value is the maximum transmittable torque of the transmission 40 (FIG. 4A), which is 100 Nm in this embodiment.

As shown by the thick solid line in FIG. 4A, the engine torque limit Tl increases by a predetermined value ΔTr every 10 ms after the oil temperature exceeds −20° C. at time t1. Thus, as shown by the dashed line in FIG. 4A, the input torque from the engine to the transmission system gradually rises.

At the same that the engine torque limit Tl becomes the target engine torque tTe (for example, 300 Nm), the engine torque limit, Tl is changed to the second limiting value (for example, 400 Nm) in order to ensure that the limit on the engine torque is substantially removed. The second limiting value is greater than the maximum output torque of the engine 60. Then the engine outputs the target torque calculated based on FIG. 2 from the engine rotation speed and the accelerator pedal travel TVO.

Figure 5A:
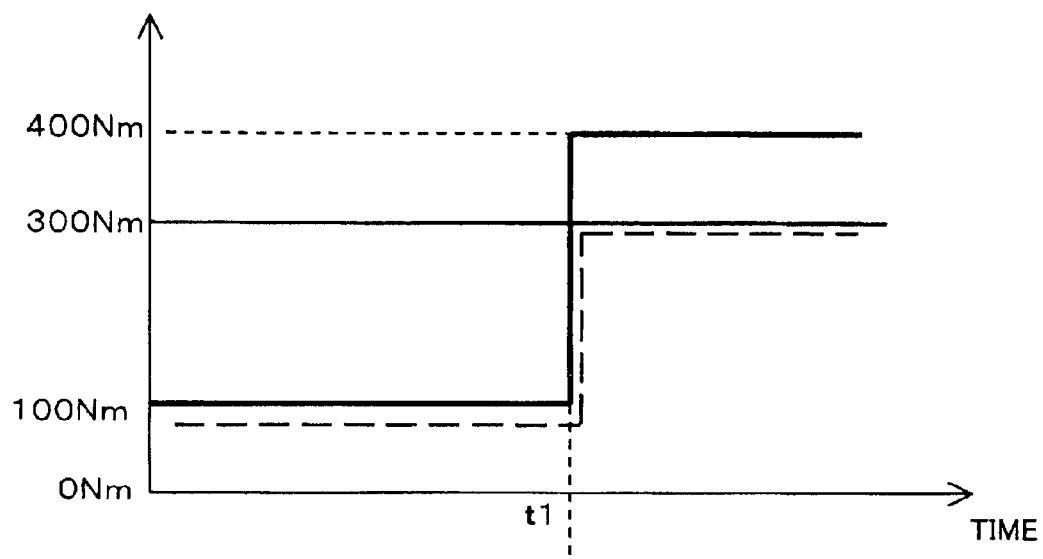
FIG. 5A is a graph showing the temporal change in engine torque limit and the temporal change in engine torque according to conventional art.
Figure 5B:
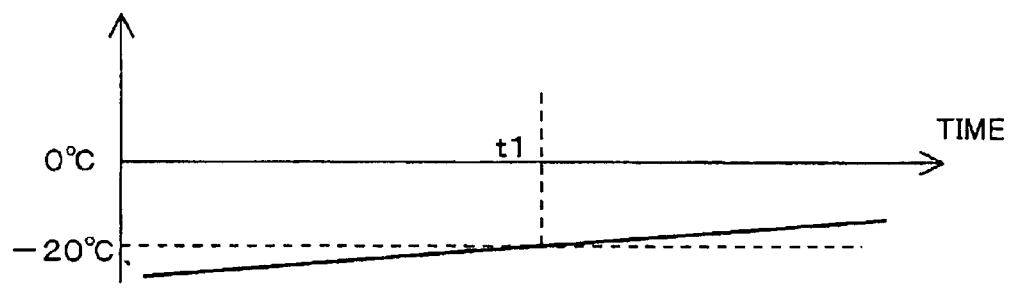
FIG. 5B is a graph showing the temporal change in oil temperature.

FIG. 5 is a graph showing the setting of the conventional engine torque limit and the corresponding input torque from the engine to the transmission system. The lines are the same as in FIG. 4, where the thick solid line shows the engine torque limit, the dashed line shows the input torque from the engine, and the thin solid line shows the target engine torque.

As shown by the thick solid line in FIG. 5A, the engine torque limit is increased all at once to the maximum output torque of the engine when the oil temperature has exceeded (time t1) a specific temperature (for example, −20° C.). In other words, the engine torque limit increases discontinuously from the first limiting value (for example, 100 Nm) to the second limiting value (for example, 400 Nm) and the increase rate of the engine torque limit is infinite. Therefore, the engine torque suddenly increases, resulting in a large shock.

However, according to the present embodiment, as shown in FIG. 4, since the engine torque limit Tl gradually increases and the engine torque also increases in a corresponding manner, torque shocks can be reduced. A reduction in the durability of the CVT unit can also be prevented.

A second embodiment of the engine torque control apparatus will be described with reference to the flow chart shown in FIG. 6. The first embodiment and second embodiment differ in terms of the engine torque control performed by the controller 50, and other characteristics are common in the first embodiment and second embodiment.

Figure 6:
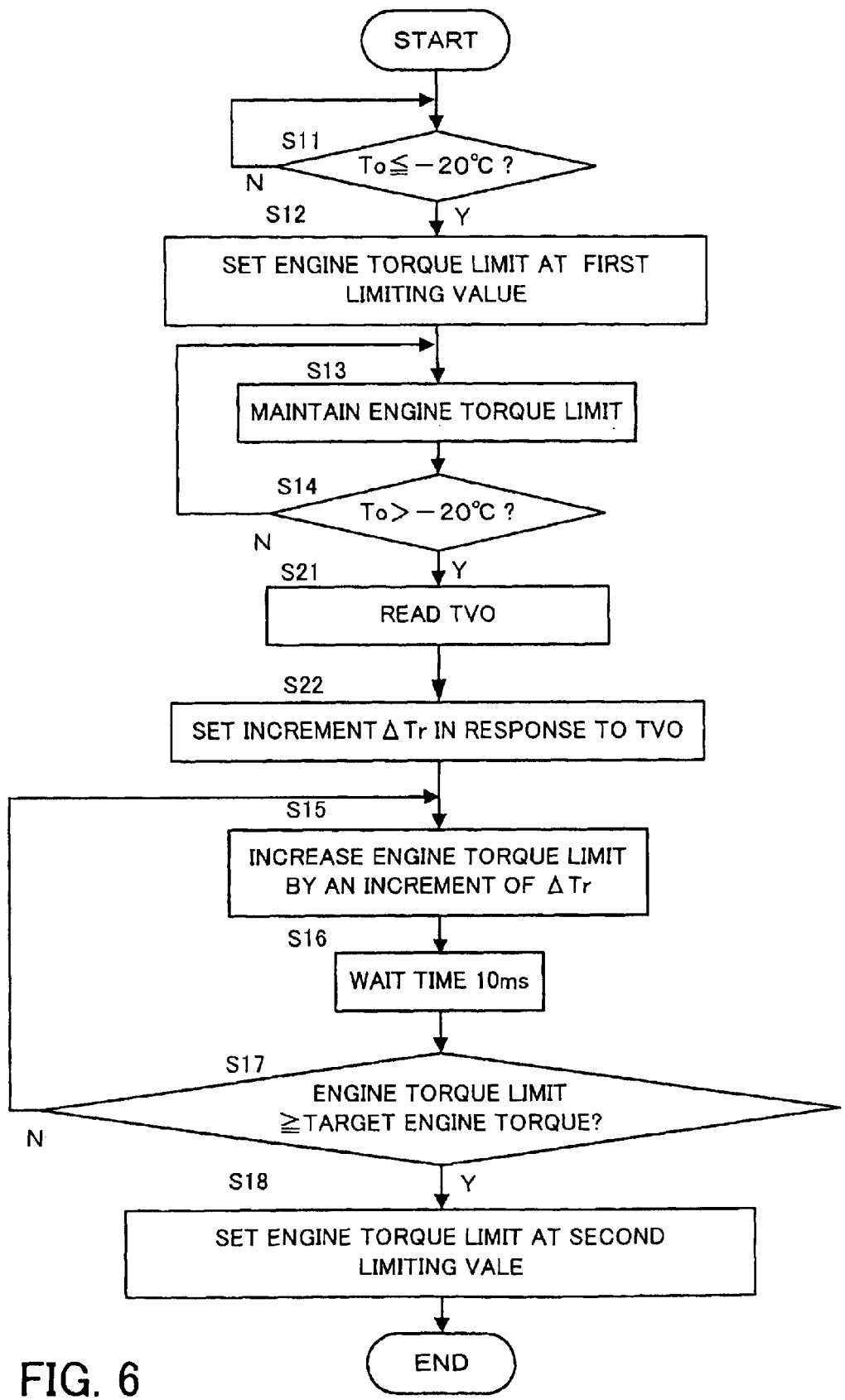
FIG. 6 is a flow chart showing the control executed by the engine torque control apparatus according to the second embodiment.

FIG. 6 is a control routine for controlling the engine torque performed by the controller 50. Identical symbols are used in the same steps as in FIG. 3, which depicts the first embodiment, and explanations thereof are omitted.

Figure 3:
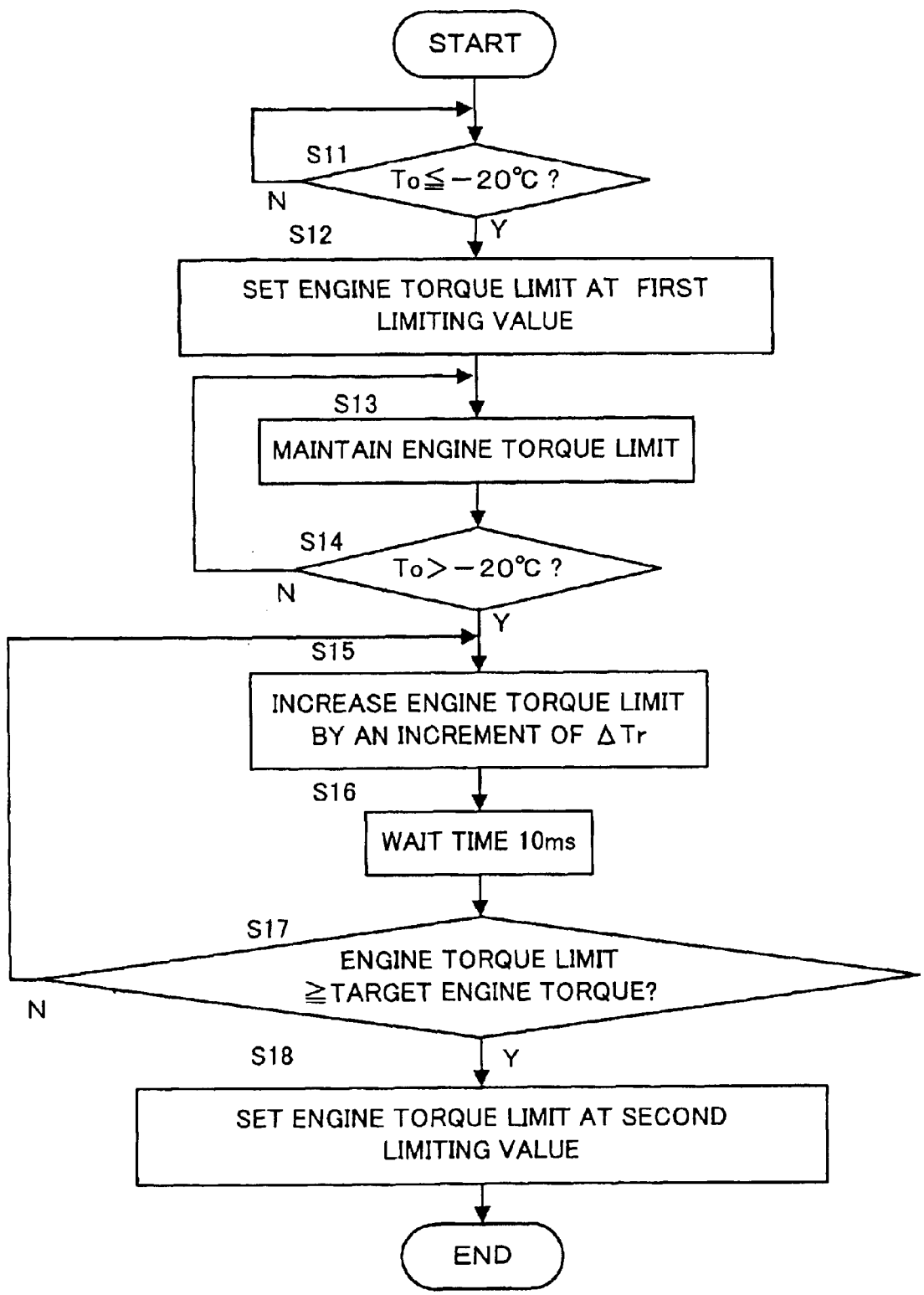
FIG. 3 is a flow chart showing the control executed by the engine torque control apparatus according to the first embodiment.

In the second embodiment, steps S21 and S22 are introduced between steps S14 and S15 in FIG. 3 of the first embodiment. The accelerator pedal travel TVO is read in step S21. The increment ΔTr of the engine torque limit Tl are set in response to the accelerator pedal travel TVO in the step S22. The increment ΔTr increases according to the increase in the accelerator pedal travel TVO. Thus, the increase rate of the engine torque limit Tl increases according to the increase in the accelerator pedal travel TVO. Conversely, as the accelerator pedal travel TVO decreases, the increase rate of the engine torque limit Tl decreases as well.

Figure 7A:
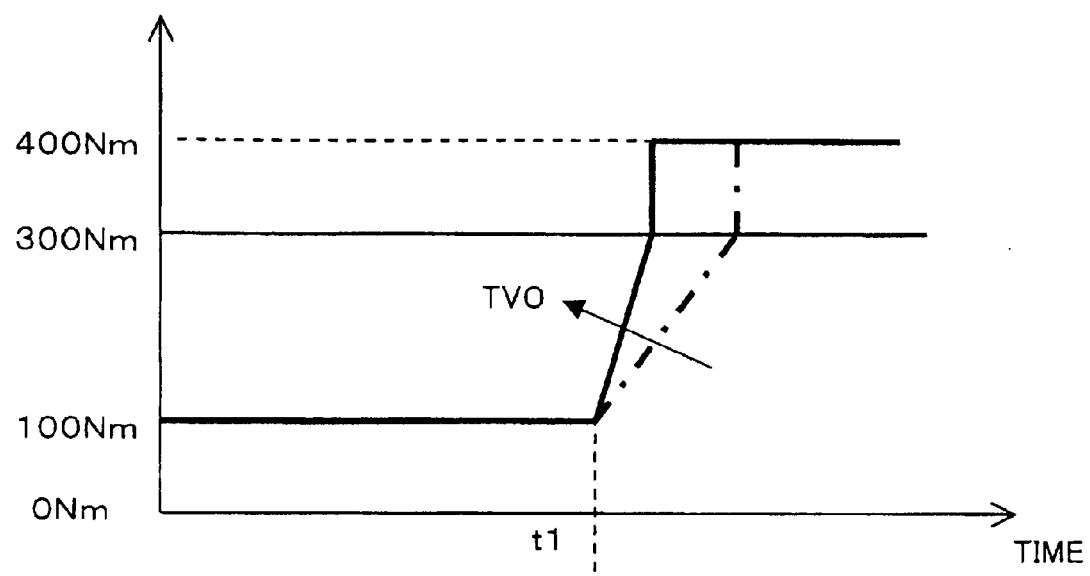
FIG. 7A is a graph showing the temporal change in engine torque limit and the temporal change in engine torque according to the second embodiment.
Figure 7B:
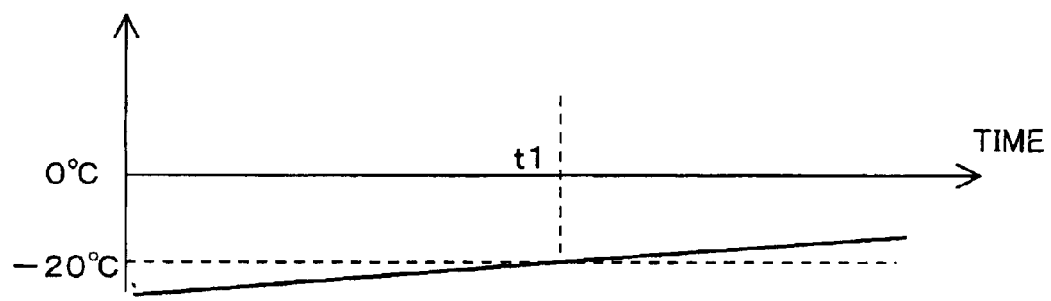
FIG. 7B is a graph showing the temporal change in oil temperature.

The results of the second embodiment are described with reference to FIGS. 7A and 7B. In FIG. 7A, the engine torque limit Tl when the accelerator pedal travel is large is shown by the thick solid line, and the engine torque limit Tl when the accelerator pedal travel is small is shown by the dashed line. FIG. 7B shows the change over time in oil temperature. In order to avoid complications in the diagram, the dashed line showing the input torque from the engine to the transmission system is not shown in FIG. 7A, but the input torque changes along the line of the engine torque limit similar to FIG. 4A.

In the present embodiment, as shown in FIG. 7A, the increase rate of the engine torque limit Tl increases as the accelerator pedal travel TVO increases. When the accelerator pedal travel TVO is large, the engine torque limit increases quickly. When the accelerator pedal travel TVO is small, the engine torque limit Tl increases slowly. Since the engine torque is required to rapidly increase when the accelerator pedal travel is large, the increase rate of the engine torque limit Tl is increased.

The entire contents of Japanese Patent Application P2002-254057 (filed Aug. 30, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An engine torque control apparatus for controlling an output torque of an engine connected to a transmission in a vehicle, comprising:
   a temperature sensor for detecting a temperature of oil supplied to the transmission; and
   a controller for limiting the output torque of the engine to an engine torque limit or less, said controller being linked to the temperature sensor,
   wherein the controller functions to:
   compare the oil temperature with a specific temperature;
   set the engine torque limit to a first limiting value when the oil temperature is equal to or less than the specific temperature; and
   increase the engine torque limit at a predetermined increase rate when the oil temperature is greater than the specific temperature.

2. The engine torque control apparatus according to claim 1, wherein the controller functions to increase the engine torque limit stepwise in every predetermined time when the oil temperature is greater than the specific temperature.

3. The engine torque control apparatus according to claim 1, wherein the controller functions to:
   calculate a maximum torque that can be transmitted by the transmission when the oil temperature is equal to or less than the specific temperature; and
   set the first limiting value to the maximum transmittable torque.

4. The engine torque control apparatus according to claim 1, wherein the controller functions to compare the engine torque limit with a target engine torque and to change the engine torque limit to a second limiting value at the same that the engine torque limit becomes the target engine torque.

5. The engine torque control apparatus according to claim 1, wherein the second limiting value is greater than a maximum output torque of the engine.

6. The engine torque control apparatus according to claim 1, comprising:
   a throttle valve provided with the controller for adjusting an air intake of the engine; and
   a sensor for detecting an opening of the throttle valve,
   wherein the controller functions to increase the value of the predetermined increase rate as the detected throttle valve opening increases.

7. The engine torque control apparatus according to claim 1, wherein the specific temperature is the lowest temperature at which a desirable oil pressure can be obtained, and the specific temperature depends on the type of oil.

8. The engine torque control apparatus according to claim 1, wherein the controller comprises a microcomputer coupled to the temperature sensor, a fuel injection apparatus for injecting fuel into the engine, a throttle valve for controlling the air intake of the engine, and an ignition apparatus for igniting the fuel; and the controller functions to limit the output torque of the engine to the engine torque limit or less by adjusting at least one of an amount of fuel injected by the fuel injection apparatus, an opening of the throttle valve, and an ignition timing of the ignition apparatus.

9. A control method for controlling an output torque of an engine connected to a transmission in a vehicle, comprising the steps of:

- detecting a temperature of oil supplied to the transmission;
- comparing the oil temperature with a specific temperature;
- setting an engine torque limit to a first limiting value when the oil temperature is equal to or less than the specific temperature;
- increasing the engine torque limit at a predetermined increase rate when the oil temperature is greater than the specific temperature; and
- limiting the output torque of the engine to the engine torque limit or less.

10. An engine torque control apparatus for controlling an output torque of an engine connected to a transmission in a vehicle, comprising:

- means for detecting a temperature of oil supplied to the transmission; and
- means for comparing the oil temperature with a specific temperature;
- means for setting an engine torque limit to a first limiting value when the oil temperature is equal to or less than the specific temperature;
- means for increasing the engine torque limit at a predetermined increase rate when the oil temperature is greater than the specific temperature; and
- means for limiting the output torque of the engine to the engine torque limit or less.

* * * * *